United States Patent [19]

Pühringer et al.

[11] Patent Number: 4,867,787
[45] Date of Patent: Sep. 19, 1989

[54] MILL ARRANGEMENT WITH TEMPORARY STORAGE VESSEL AND A PROCESS OF OPERATING THE SAME

[75] Inventors: Othmar Pühringer; Felix Wallner; Horst Wiesinger, all of Linz; Ernst Eichberger, Pichl/Wels; Wilhelm Schiffer, Traun; Walter Rockenschaub, Linz, all of Austria

[73] Assignee: Voest-Alpine Aktiengesellschaft, Linz, Austria

[21] Appl. No.: 81,465

[22] Filed: Aug. 4, 1987

[30] Foreign Application Priority Data

Aug. 12, 1986 [EP] European Pat. Off. ........ 86890228.9

[51] Int. Cl.$^4$ .................... C21B 13/14; F27B 19/04
[52] U.S. Cl. ................................. 75/38; 75/46; 75/59.23; 266/142; 266/160
[58] Field of Search ............... 75/38, 40, 43, 44 R, 75/44 S, 59.18, 59.1, 46, 59.23; 266/160, 142

[56] References Cited

U.S. PATENT DOCUMENTS

| | | | |
|---|---|---|---|
| 4,244,732 | 1/1981 | Brauns | 75/38 |
| 4,419,128 | 12/1983 | Nakagawa et al. | 75/46 |
| 4,578,110 | 3/1986 | Price-Falcon | 266/160 |
| 4,690,387 | 9/1987 | Rockenschaub et al. | 75/59.18 |

FOREIGN PATENT DOCUMENTS

| | | |
|---|---|---|
| 0126391 | 11/1984 | European Pat. Off. . |
| 0179014 | 4/1986 | European Pat. Off. . |
| 61-23310 | 9/1981 | Japan .................................... 75/38 |

OTHER PUBLICATIONS

*Direct Reduced Iron,* TN707 D 56, Aug. 1982 pp. 115–118.

*Primary Examiner*—Melvyn J. Andrews
*Attorney, Agent, or Firm*—Hopgood, Calimafde, Kalil, Blaustein & Judlowe

[57] ABSTRACT

In operating a mill including a blast furnace and a steel converter, it is difficult to mutually adapt the operations of the blast furnace and of the converter in a flexible way. When using scrap as a coolant in the refining process, undesired accompanying elements are introduced into the metal melt.

The invention consists in that, instead of a blast furnace, a direct reduction plant in combination with a meltdown gasifier are provided as the pig iron source. This aggregate is operated in combination with a single steel converter. The direct reduction plant, on its discharge side, is connected both with the meltdown gasifier and with the steel converter via sponge iron transporting devices. The meltdown gasifier communicates with the steel converter via a transport line for molten pig iron. As the solid charge in the refining process sponge iron is exclusively used.

3 Claims, 1 Drawing Sheet

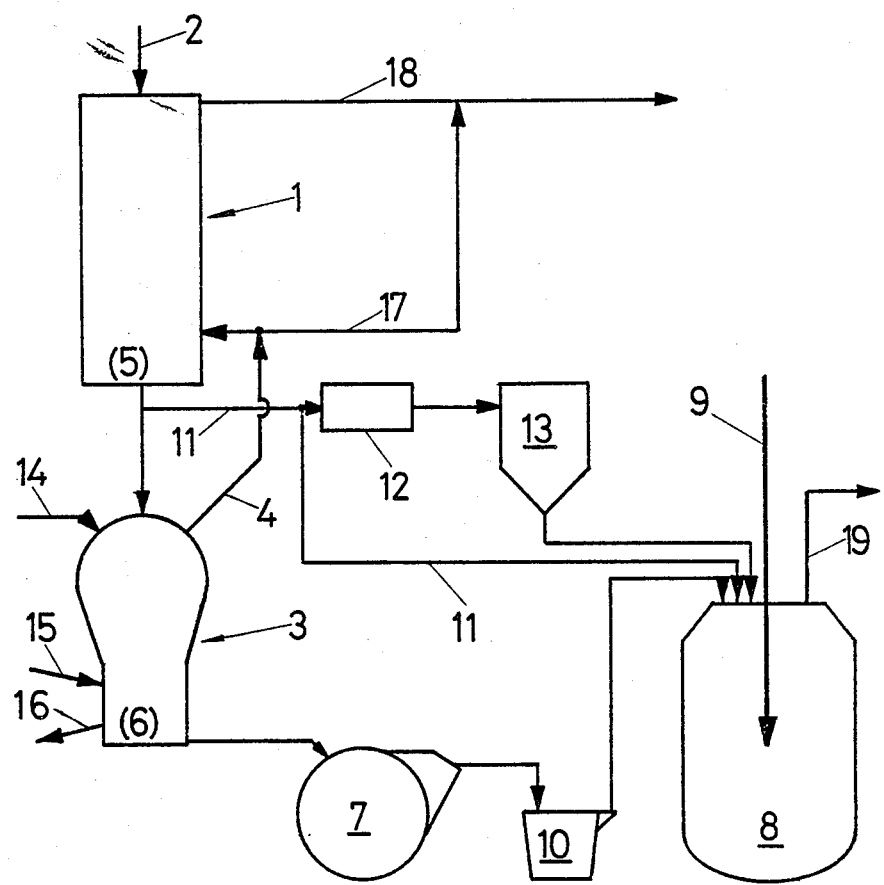

MILL ARRANGEMENT WITH TEMPORARY STORAGE VESSEL AND A PROCESS OF OPERATING THE SAME

The invention relates to a mill for the production of steel from oxidic ferrous carriers, such as ore, as well as to a process of operating such a mill.

In conventional mills, which produce steel in steel converters by top blowing oxygen onto and/or blowing oxygen into a molten pig iron, the pig iron is produced in blast furnaces by using ores and high-quality coke. Since the pig iron production in large blast furnaces is the most economic, developments have tended to go into the direction of blast furnaces with the highest outputs, which must be operated over periods of time as long as possible without interruption. When using such blast furnaces, large amounts of pig iron must be taken over by the steelworks, i.e., a plurality of high-capacity steel converters is required to process the pig iron. Storage of the molten pig iron produced is possible to a limited extent only. Casting of molten pig iron to pigs during interruptions in the steelworks operation or during operational failures is uneconomical.

In conventional mills, steel scrap is primarily used as coolant in steel converters. When using scrap, the steelworks operator will be faced with problems in case the scrap is bought, not knowing its exact composition. Frequently, undesired accompanying elements are introduced into the metal melt by such scrap, which cannot be removed any more in the refining process.

If ore is used as coolant instead of contaminated scrap—ore having a cooling effect approximately three to four times higher than scrap—it is necessary to use comparatively more pig iron, which renders the process more expensive.

The invention aims at avoiding the disadvantages and difficulties pointed out and has as its object to provide a mill as well as a process of operating the same, by which the production of high-purity steel from lumpy oxidic ferrous carriers is feasible, wherein molten pig iron may be made available in an economic way and without high investment costs. The aggregate delivering pig iron and the steel converter are to be flexible in mutual adaptation.

The solution of the object of the invention consists in the combination of a direct reduction plant, in particular a direct reduction shaft furnace, for the production of sponge iron with a meltdown gasifier and a single steel converter, wherein the direct reduction plant, on its extraction side, communicates with both the meltdown gasifier and the steel converter via transporting means for sponge iron, and the meltdown gasifier. The meltdown gasifier is associated with a temporary storage vessel for molten pig iron for subsequent charging to the steel converter via a transport ladle for said molten pig iron.

Thus, the temporary storage vessel for molten pig iron which is disposed between the meltdown gasifier and the steel converter enables the flexible operation of the meltdown gasifier relative to the steel converter.

The process according to the invention, for operating the mill comprises introducing lumpy oxidic ferrous carriers into the reduction zone of the direct reduction plant and reducing them by reduction gas produced in the meltdown gasifier from coal and oxygen-containing gas, for one part, introducing the reduced product—sponge iron—in a hot state into the melting zone of the meltdown gasifier, heating, liquefying and carburizing it there, with molten pig iron forming, for the other part, discharging the reduced product from the direct reduction plant, and charging molten pig iron from the meltdown gasifier as well as sponge iron from the direct reduction plant into the steel converter and refining them, wherein sponge iron exclusively is used as the solid charge.

As compared to conventional mills using a blast furnace as pig iron producer, the plant according to the invention has the advantage that it may be started and stopped without any problems and that but a single converter is required in the steelworks. The latter may operate according to the top blowing method, the bottom blowing method or according to a combination of these two methods. It need not be conceived as an interchangeable crucible. During a new lining of the converter, with the removal of the brickwork requiring a period of three and a half to four days, the production of the direct reduction plant and of the meltdown gasifier may be interrupted without difficulties.

The steel produced according to the process of the invention may be cast and hot formed in the usual way. Casting may be effected by continuous casting. The scrap incurring at the processing of steel is not used in the pertaining steelworks, but may be solid, thus saving a special scrap management with the necessary storage sites, hoists and transporting means.

In a mill according to the invention, pig iron tapping, charging of the converter and transfer of the molten steel to the casting arrangement may be realized in a single hall.

By the mutually flexible adaptation of pig iron production and steel production, additional installations, such as media management, secondary dedusting and slurry treatment, may be realized commonly for both plant parts.

The invention will be explained in more detail by way of the accompanying flow sheet.

A direct reduction plant 1, preferably a reduction shaft furnace, is charged with lumpy ore from a charging means 2. The shaft furnace is connected with a meltdown gasifier 3, in which, from coal and oxygen-containing gas, a reduction gas is produced, which is fed to the reduction shaft furnace via a duct 4.

In the shaft furnace, the lumpy ore is reduced to sponge iron 5. The sponge iron partially is supplied to the meltdown gasifier and is smelted in the meltdown zone to pig iron 6. The molten pig iron is collected in a temporary vessel 7, for instance, a pipe ladle.

The plant according to the invention comprises a steel converter 8, which, in the present case, is designed as an oxygen top-blowing converter and is operated with an oxygen lance 9 led from top into the converter. The converter 8, via a transport line, which comprises transporting ladles 10 in the embodiment illustrated, partially is charged with molten pig iron from the temporary vessel 7 and partially is fed with sponge iron being branched off the shaft furnace via conveying means 11. The sponge iron may be used either directly in the hot state or upon cooling in a cooling means 12 and temporary storage in a reservoir 13. Its addition may be effected in portions or continuously.

To produce the reduction gas and the heat necessary for melting of the sponge iron, coal and oxygen-containing gas are supplied to the meltdown gasifier through ducts 14 and 15, respectively. The slag forming in the meltdown gasifier 3 is separated from the pig iron and tapped through tap 16. If the gas produced in the meltdown gasifier is not totally required for the reduction in the reduction shaft, the excess gas is drawn off and supplied to other consumers via duct 17. The same holds for the top gas drawn off through duct 18 on top of the reduction shaft and for the converter offgas, which is conducted away via duct 19.

A typical exemplary embodiment of the process according to the invention when using a 40 ton top-blowing converter is the following:

74.7 tons of sponge iron having a composition of 93.3% Fe, 0.96% CaO, 3.94% $SiO_2$, 0.09% MnO, 0.96% $Al_2O_3$, 0.04% $P_2O_5$ and 4.2% total carbon (1.1% $Fe_3C$, 3.1% elementary carbon) are produced from 103.2 t ore/h having a composition of 93.17% $Fe_2O_3$, 0.02% S, 0.14% $CO_2$, 1.03% CaO, 0.07% MnO, 2.84% $SiO_2$, 0,08% MgO, 0.67% $Al_2O_3$, 0.03% $P_2O_5$ and 0.80% balance portions in a direct reduction shaft furnace by using a reduction gas composed of 67.78% CO, 2.46% $CO_2$, 0.43% $CH_4$, 27.17% $H_2$, 1.55% $H_2O$, 0.35% $N_2$ and 0.26% $H_2S$.

The sponge iron incurs at a temperature of 850° C. 78.3% (58.5 t) of this amount is used in the meltdown gasifier and melted to 55.6 t pig iron/h having a composition of 4.10% C, 1.00% Si, 0.08% Mn, 0.05% P and 0.03% S and a temperature of 1,370° C. This pig iron is tapped into a temporary vessel, for instance a tube ladle, and is supplied to the converter as the liquid charge. 21.7% (16.2 t) of the amount of sponge iron produced is discharged, cooled and used in the converter as a solid charge or coolant.

The converter has a capacity of 40 tons, the hourly output being 63.3 tons. Crude steel having a temperature of 1,650° C. and an analysis of 0.04% C, 0.02% Mn, 0.020% P and 0.020% S is produced.

The coal used in the meltdown gasifier has an analysis of 73.56% C, 4.32% $H_2$, 0.76% $N_2$, 9.46% $O_2$, 0.72% S and 11.01% ash.

What we claim is:

1. A mill arrangement for producing steel from ore comprising the combination of:
    a direct reduction shaft furnace for production sponge iron from iron ore fed to said reduction shaft furnace,
        said reduction shaft furnace having a discharge side,
    a meltdown gasifier communicating with the discharge side of said reduction shaft furnace via sponge iron transfer means cooperably associated with said discharge side for producing pig iron from said sponge iron,
    means for feeding coal and oxygen-containing gas to said gasifier,
    means for feeding reducing gas from said gasifier to said reduction shaft furnace,
    a temporary storage vessel cooperably associated with said meltdown gasifier for storing molten pig iron therein for subsequent delivery to said steel converter,
    a single steel converter for receiving molten pig iron therein for conversion to steel,
    and a transport ladle cooperably associated with said temporary storage vessel and said steel converter for transporting said molten pig iron to said steel converter for conversion into steel,
        said mill arrangement being such that a flexible steel-making operation is provided whereby said meltdown gasifier is enabled to continue to produce pig iron for storage in said temporary storage vessel while awaiting completion of said steel conversion and the discharge therefrom from said converter.

2. The mill arrangement of claim 1, wherein the discharge side of said shaft furnace has additional transport means for feeding at least a portion of said sponge iron to said steel converter.

3. A process for operating a mill arrangement comprising a direct reduction shaft furnace for producing sponge iron from iron ore fed to it, a meltdown gasifier in communication with said shaft furnace via transport means for said sponge iron to produce pig iron therefrom, a temporary storage vessel cooperably associated with said meltdown gasifier for receiving pig iron therefrom for subsequent transfer to ladle, a single steel converter located in a line of pig iron transfer from said meltdown gasifier to said temporary storage vessel and subsequently to said ladle for transfer to said steel converter, said process comprising the steps of flexibly coordinating the production of pig iron with its final conversion into steel in the steel converter as follows:
    introducing lumpy ore into said direct reduction shaft furnace and reducing said lumpy ore by reduction gas produced in said meltdown gasifier from coal and oxygen-containing gas so as to obtain a reduced product comprised of sponge iron,
    separating said sponge iron into a first sponge iron portion and a second sponge iron portion,
    introducing coal and oxygen-containing gas into said meltdown gasifier,
    introducing said first sponge iron portion in a hot state into said meltdown gasifier and thereby melt and carburize said sponge iron to form molten pig iron,
    discharging said second sponge iron portion from said direct reduction shaft furnace for subsequent feeding to said steel converter,
    discharging said pig iron from said meltdown gasifier to said temporary storage vessel,
    transporting said molten pig iron from said temporary storage vessel to a ladle and from there to said single steel converter and thereby flexibly adapt the operation of said meltdown gasifier with the operation of said single steel converter,
    charging said second sponge iron portion as the only solid charge into said single steel converter, and
    refining said molten pig iron and said sponge iron in said single steel converter to produce steel as a final product while producing pig iron in said meltdown gasifier.

* * * * *